Feb. 17, 1925.
W. DUBILIER
ELECTRICAL CONDENSER
Filed Oct. 6, 1923
1,526,664
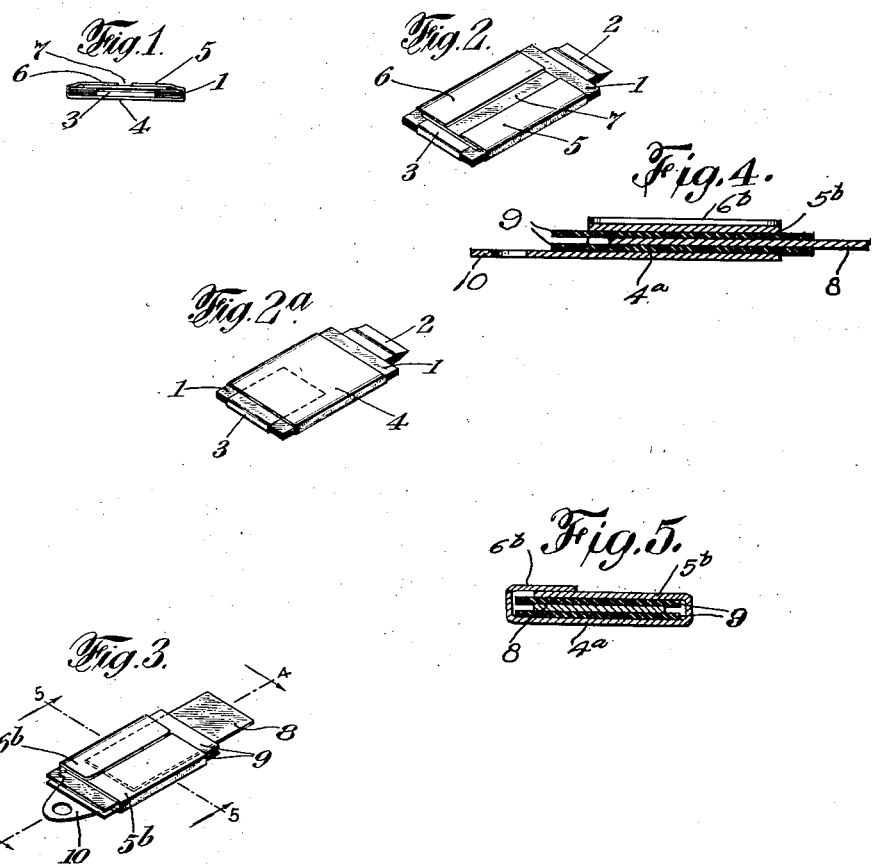

Patented Feb. 17, 1925.

1,526,664

UNITED STATES PATENT OFFICE.

WILLIAM DUBILIER, OF BRONXVILLE, NEW YORK, ASSIGNOR TO DUBILIER CONDENSER AND RADIO CORPORATION, OF NEW YORK, N. Y., A CORPORATION OF DELAWARE.

ELECTRICAL CONDENSER.

Application filed October 6, 1923. Serial No. 666,889.

*To all whom it may concern:*

Be it known that I, WILLIAM DUBILIER, a citizen of the United States, a resident of Bronxville, in the county of Westchester and State of New York, have invented a certain new and useful Electrical Condenser, of which the following is a specification.

One object of the invention is to provide an electrical condenser in which the conducting plates or armatures will be effectively held in the proper relation to each other, to the end that the capacity of the condenser will be substantially constant, but in which the number of elements necessary to be employed for providing the armatures and effectively clamping them together, will be reduced to a minimum.

According to one embodiment of the invention one armature or set of armatures for the condenser is constituted solely by a clamp which serves to hold the armatures of the condenser in proper relation to each other, as above described.

Further objects and advantages of the invention will be in part obvious and in part specifically pointed out in the description hereinafter contained, which, taken in connection with the accompanying drawings, discloses certain preferred embodiments thereof; such embodiments, however, are to be considered as merely illustrative of its principles. In the drawings:

Fig. 1 is an end view, and Fig. 2 a perspective view, of an electrical condenser constructed in accordance with the invention.

Figure 2ª is a perspective view similar to Figure 2.

Figure 3 is a perspective view showing a modified form of the invention.

Figs. 4 and 5 are sections taken respectively on the lines 4—4 and 5—5 of Fig. 3, looking in the direction of the arrows.

In my prior copending United States application Serial No. 562,946, filed May 23, 1922, entitled Condenser clamping device, I have disclosed a condenser clamp consisting of a clamping member of stiff but bendable metal, such as tin or copper, pressed around and into engagement with a condenser stack in such a way as to hold the sheets of the latter in proper relation to each other, and also described such a condenser stack and clamp wherein the clamp is electrically connected in circuit, and thus acts as an armature. The present application contains certain subject matter in common with my prior application above described.

In accordance with one aspect of the present invention a clamping member of the character above described serves the double purpose of a clamp and an armature. In Figures 1 and 2, for example, there is shown a condenser stack consisting of a plurality of insulating sheets 1 of mica or the like interleaved with sets 2 and 3 of conducting plates which alternate with each other making up an elementary single section condenser which may be suitably compressed, evacuated or impregnated, if desired, for example as described in U. S. Patent 1,345,-754, issued to me on July 6, 1920.

The clamping member as shown in Figures 1 and 2 has an intermediate portion 4 which overlies the active area of one face of the condenser and end portions 5 and 6 which extend around opposite sides of the stack to overlie the opposite faces thereof, after which the clamping member may be compressed into firm engagement with the opposed faces of the condenser, for example, by subjecting the same to a blow from a power press or the like. If desired, a bearing plate 7 may be interposed between the ends 5 and 6 of the clamping member and the corresponding face of the condenser, such bearing plate being either of stiff insulating material or metal.

The clamping member is also connected in the condenser circuit to act as an armature, this being accomplished in Figure 2 by folding over projecting portions of the conducting plates 3 and inserting the same between one face of the stack and the intermediate portion 4 of the clamping member, thus the clamping member, being in good inductive relation to the plates of the stack which are of different polarity, reduces the number of additional conducting plates which otherwise would be necessary to form a condenser of given capacity.

Figures 3 to 5 illustrate another aspect of the present invention wherein a condenser clamp, in addition to performing its clamping function, constitutes the sole armature, or set of armatures, of one polarity, eliminating entirely the necessity of providing special conducting plates to serve as armatures of such polarity. The clamp illustrating this aspect of the invention may be of the same general nature as described in connection with Figures 1 and 2 consisting of a member of stiff bendable metal having one portion 4ª which overlies one face of the condenser stack and, as illustrated, the clamping member extends around one side of the stack and is provided with another portion 5ᵇ which overlies the active area of the opposite face of the condenser; if desired, an end portion 6ᵇ of the clamping member may also be provided extending around the opposite side of the stack end and overlying the portion 5ᵇ to insure that the latter will be maintained in firm engagement with the stack.

The condenser shown in Figures 3 to 5 is of exceedingly simple construction involving only the clamping member above described and a single plate 8, such as a sheet of tinfoil or copper, to constitute an armature of opposite polarity from the clamp. Dielectric sheets 9 of mica or the like completely insulate the conducting plate 8 from the clamp.

As shown the conducting plate 8 is extended beyond insulating sheets 9 at one side edge of the condenser to permit electrical connection to be made thereto and the clamp is provided with an apertured lug or ear 10 projecting beyond the other side edge of the condenser for the same purpose.

While certain specific embodiments of the invention have been disclosed it will be obvious that many changes may be made therein without departing from its principles as defined in the appended claims.

I claim:

1. An electrical condenser having armatures of different polarities, one of such armatures comprising a conducting plate, insulating sheets disposed on opposite sides of such plate, and another set of armatures constituted solely by a metallic clamp engaging said insulating sheets to be electrically connected in one side of the condenser circuit.

2. An electrical condenser comprising in combination, at least one conducting plate constituting an armature, insulating sheets disposed on opposite sides thereof, a metallic clamping device comprising a member of stiff but bendable metal overlying the central active area of one face of the condenser and extending around at least one side of the condenser to bear against the active area of the other face of the condenser and compress the same, said clamping member having a perforated ear extended therefrom to serve as an electrical connector.

3. An electrical condenser comprising in combination, at least one conducting plate constituting an armature, insulating sheets disposed on opposite sides thereof, a metallic clamping device comprising a member of stiff but bendable metal overlying the central active area of one face of the condenser and extending around at least one side of the condenser to bear against the active area of the other face of the condenser and compress the same, said clamping member having a perforated ear extended therefrom to serve as an electrical connector, and said conducting plate having a portion projecting outwardly of the insulated sheets also to serve as a terminal connector.

4. An electrical condenser comprising condenser elements, one of which is made of stiff bendable metal and acts as a compression covering for the condenser, and a perforated ear extending from said compression covering to serve as an electrical connector.

5. An electrical condenser comprising at least one inner condenser element, insulation therefor, an outer condenser element of stiff bendable metal acting as a compression covering by reason of the resilience of the metal itself, and a perforated ear extending from said compression covering to serve as an electrical connector and mechanical support for the condenser.

In testimony that I claim the foregoing, I have hereunto set my hand this 26th day of September, 1923.

WILLIAM DUBILIER.